United States Patent [19]
Russ

[11] Patent Number: 5,852,600
[45] Date of Patent: Dec. 22, 1998

[54] SYSTEM AND METHOD FOR RESOLVING SUBSTANTIALLY SIMULTANEOUS BI-DIRECTIONAL REQUESTS OF SPARE CAPACITY

[75] Inventor: Will Russ, Dallas, Tex.

[73] Assignee: MCI Communications Corporation, Washington, D.C.

[21] Appl. No.: 483,578

[22] Filed: Jun. 7, 1995

[51] Int. Cl.[6] .................................................. H04B 10/08
[52] U.S. Cl. ...................... 370/228; 370/462; 340/825.01
[58] Field of Search ........................... 370/16, 16.1, 85.6, 370/85.12, 60.1, 54, 85.2, 85.3, 462, 461, 447, 448, 216, 252, 228, 225; 395/181, 182.02, 182.01; 340/827, 825.01–825.05, 825.06, 825.16; 379/268, 279

[56] References Cited

U.S. PATENT DOCUMENTS

| | | | |
|---|---|---|---|
| 4,560,985 | 12/1985 | Strecker et al. | 370/447 |
| 4,626,843 | 12/1986 | Szeto et al. | 370/462 |
| 4,740,956 | 4/1988 | Hailpern et al. | 370/364 |
| 4,847,610 | 7/1989 | Ozawa et al. | 370/224 |
| 5,124,983 | 6/1992 | Landez et al. | 370/461 |
| 5,179,669 | 1/1993 | Peters | 370/462 |
| 5,235,599 | 8/1993 | Nishimura et al. | 370/218 |
| 5,319,642 | 6/1994 | Ota | 370/447 |

*Primary Examiner*—Chau Nguyen
*Assistant Examiner*—Seema S. Rao

[57] ABSTRACT

In a self healing network (SHN) distributed restoration algorithm (DRA) scheme, in the case where two adjacent tandem nodes are contending for the same spare link, an arbitration scheme is used to determine which tandem node has the right to reserve the spare link for its use. The arbitration scheme entails a pre-event knowledge by each of the tandem nodes of the transmission time therebetween. A tandem node link arbitration timer in each of the adjacent nodes provides a predefined time period for which a node can compare whether it had begun sending out its flooding signature before the far end node had sent out its. Thus, when a node detects a newly arrived signature received from the spare link that connects the node to its far end node, and if this newly arrived signature is detected before the predefined time period has elapsed, then the node will give up the spare link for the use of the far end node. Alternatively, if the signature, if any, from the far end node is detected by the node only after the predefined time has elapsed, then the node will reserve the connecting spare link for its own use.

26 Claims, 3 Drawing Sheets

SYSTEM AND METHOD FOR RESOLVING SUBSTANTIALLY SIMULTANEOUS BI-DIRECTIONAL REQUESTS OF SPARE CAPACITY

RELATED APPLICATIONS

This invention relates to an application by Russ et al. entitled "Method and System for Resolving Contention of Spare Capacity Circuits of a Telecommunications Network", to be assigned to the same assignee of the instant invention and filed on Jun. 6, 1995 having ser. No. 08/468,302, now U.S. Pat. No. 5,657,320. The disclosure of the related '302 application, incorporated by reference herein, may be reviewed for an understanding of the concepts of distributed restoration algorithm schemes. This invention is further related to an application by Russ et al., entitled "Automated Restoration of Unrestored Link and Nodal Failures", to be assigned to the same assignee as the instant invention and filed concurrently herewith having Ser. No. 08/483,579, now pending.

This invention is further related to an application by Russ et al. entitled "Automated Path Verification For SHN-Based Restoration", to be assigned to the same assignee as the instant invention and filed concurrently herewith having Ser. No. 08/483,525 now U.S. Pat. 5,623,481. This invention is furthermore related to an application by J. Shah entitled "Method and System for Identifying Fault Locations In a Communications Network", to be assigned to the same assignee as the instant invention and filed concurrently herewith having Ser. No. 08/481,984 now U.S. Pat. 5,636,203. This invention is furthermore related to an application by Chow et al. entitled "System and Method for Restoring a Telecommunications Network Based on a Two Prong Approach", filed on Mar. 9, 1994, assigned to the same assignee as the instant invention. This U.S. Pat. No. 5,495,471 is incorporated by reference herein.

FIELD OF THE INVENTION

This invention relates to a distributed restoration scheme for restoring traffic disrupted by a failure in a telecommunications network and more particularly to an improvement whereby contention for the same spare link by bi-directional requests from adjacent tandem nodes is resolved.

BACKGROUND OF THE INVENTION

A self-healing network (SHN) distributed restoration algorithm (DRA), as disclosed by W. D. Grover in U.S. Pat. No. 4,956,835, multicasts a received flooding signal (signature or message) into one spare link on each logical span (except the one from which the flooding signature was received) which contains available spare links by connected tandem nodes for restoring traffic due to a failed link. This results in a unidirectional multicasting of incoming flooding signatures by each tandem node of the network. To get a more thorough understanding of the SHN scheme and the terminologies used therein, the reader should peruse the disclosure of the '835 patent, incorporated by reference herein.

In typical digital cross connect switches (DCSs), bi-directional circuits are used. Yet because the SHN flooding is controlled on a unidirectional basis, several anomalies can occur. One of these anomalies encountered by the inventor of the instant invention is similar to the "deadly embrace" problem in telephony.

This deadly embrace problem occurs because the chooser node in a SHN scheme will simply reverse link for a specific index and wait indefinitely for the alternate-routed traffic to arrive. Accordingly, any problems resulting from the failure of that traffic to arrive are not detected at the chooser node. One of such problems occurs when two unidirectional flooding signatures each use one direction of a bi-directional spare link. If both of these signatures eventually reach their chooser(s), the chooser could reverse link and effectively reserve an alternate route (alt-route) for each of the signatures which shares a common spare link. And since the traffic to be restored is bi-directional, this splitting of a spare link will not properly restore service to either of the flooded path. In an SHN environment, it results in a sender time-out without some of the failed links being restored. In other words, a deadly embrace condition exists when two adjacent tandem nodes are trying to reserve the same spare link or spare capacity, resulting in contention for that spare capacity.

A solution therefore is needed to resolve automatically the contention of spare capacity by two adjacent tandem nodes.

BRIEF DESCRIPTION OF THE PRESENT INVENTION

The present invention, an enhancement to SHN, adds a tandem node flooding rule and an associated arbitration method that serves as a mechanism to prevent the simultaneous unidirectional flooding in both directions of a bidirectional spare link. The rule prohibits any tandem node from multicasting into a spare link which is already receiving a flooding signature of any sender/chooser/index. This rule thus prevents one or more choosers from receiving flooding signatures or messages and consequently reverse linking into alt-routes which share a common link with other such sender/chooser indexes.

In the case where a tandem node and its adjacent node each transmit a flooding signature substantially at the same time out into the same spare link, an arbitration method is created where the adjacent nodes will give up the spare link to the node that transmitted its flooding signature first. This creates a fair contention scheme that optimizes the performance of the path finding aspect of SHN.

The arbitration method of the instant invention requires a pre-event knowledge by the nodes, either through manual or automatic configuration or provisioning, of the transmission delay between the adjacent nodes. Thus, when a node detects a newly arrived flooding signature from a spare link into which it has just begun sending its own flooding signature, it can make a determination on whether it or the far end adjacent node actually transmitted the flooding signature first. Once such determination is made, the node will respond by either continuing the transmission of its flooding signature, if it determines that it started flooding first, or halting its transmission of its flooding signature, if it determines that its transmission began only after the far end node had begun its flooding signature transmission. Each of the two adjacent nodes performs the instant invention arbitration method independently of the other.

An objective of the present invention is therefore to provide a fair contention scheme between adjacent tandem nodes each of which is attempting substantially simultaneously to reserve the use of a spare link connecting the two adjacent nodes.

Another objective of the instant invention is to provide a rule for enhancing the operation of an SHN scheme that prohibits any tandem node from multicasting into a spare link which already has broadcast thereinto a flooding signature.

BRIEF DESCRIPTION OF THE DRAWINGS

The above mentioned objective and advantages of the present invention will become apparent and the invention itself will be best understood by reference to the following description of an embodiment of the invention taken in conjunction with the accompanying drawings, wherein.

DETAILED DESCRIPTION OF THE PRESENT INVENTION

Figure 1:
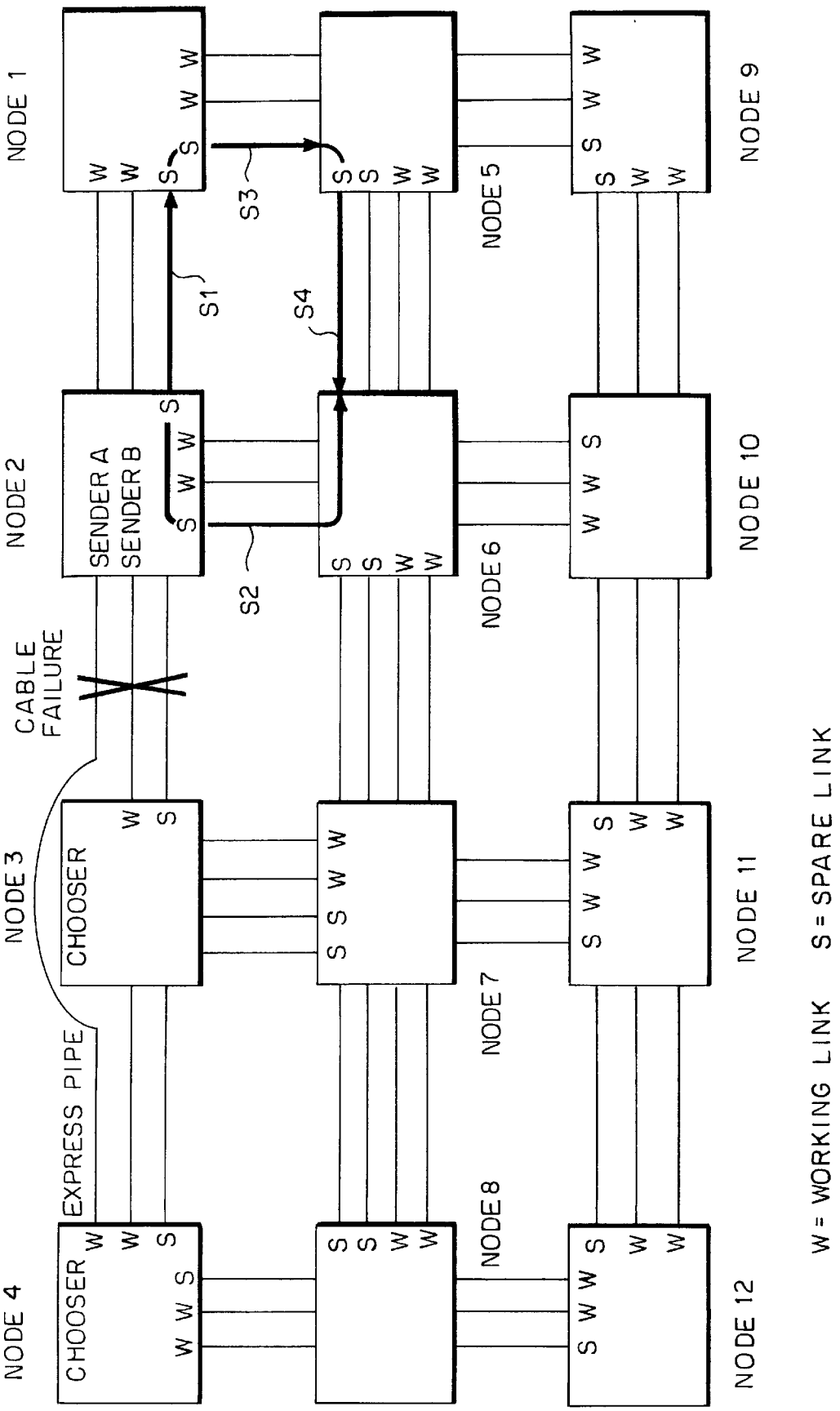
FIG. 1 is a drawing of a plurality of connected nodes for illustrating the "deadly embrace" problem in which two independent unidirectional flooding signatures are flooded into the same spare port or interface of a node.

A deadly embrace anomaly is illustrated in FIG. 1. As shown in the telecommunications network therein, 12 nodes, namely node 1 to node 12, are connected. Each of the nodes has spare links, designated S, and working links, designated W. As is well known, working links are circuits where traffic is being routed and spare links are backup circuits for restoration purposes.

As illustrated, a cable failure which may be due to a fiber cut occurred between nodes 2 and 3. Yet because node 2 is also connected to node 4 via an express pipe, in actuality, there are respective failed spans between nodes 2 and 3 and nodes 2 and 4.

Given the failures, based on the SHN scheme and particularly its conventional arbitration method of selecting the sender/chooser pair based on the designated number of the nodes, node 2, since it has a lower number than either of nodes 3 and 4, becomes the sender for both sender/chooser pairs. Thus, as shown, node 2 is the sender (sender A) while node 4 is the chooser for the first pair of sender/chooser pair, while sender 2 is the sender (sender B) while node 3 is the chooser for the second sender/chooser pair.

To reroute the disrupted traffic, given the fact that node 2 has two senders and two spare links, each sender could use one of the spare links S for sending its flooding signatures. However, for the instant invention, to keep things simple, attention needs only to be paid to sender B, i.e., the sender/chooser pair between nodes 2 and 3. Thus, for the example embodiment of the instant invention, it is assumed that sender B is to use both spare links S to search for an alt-route to the chooser of node 3.

Since node 2 is connected to nodes 1 and 6, as shown, sender B can send out its flooding signatures to node 6 via spare link S2 and node 1 via spare link S1. As shown, the flooding signature from node 2 which is routed to node 1 via spare link S1 is further routed from node 1 to node 5 via spare link S3. Thereafter, the sender B flooding signature is routed from node 5 to node 6 via spare link S4. Thus, as shown, node 6 is receiving flooding signatures from both node 2 and node 5. If these respective flooding signatures arrive at node 6 at substantially the same time, the deadly embrace problem exists. In other words, similar to the deadly embrace condition that exists in telephony, if two users were to pick up their respective telephones at the same time, each trying to call the other, then each receives a busy signal. The same situation equally applies to the example illustrated in FIG. 1.

Figure 2:
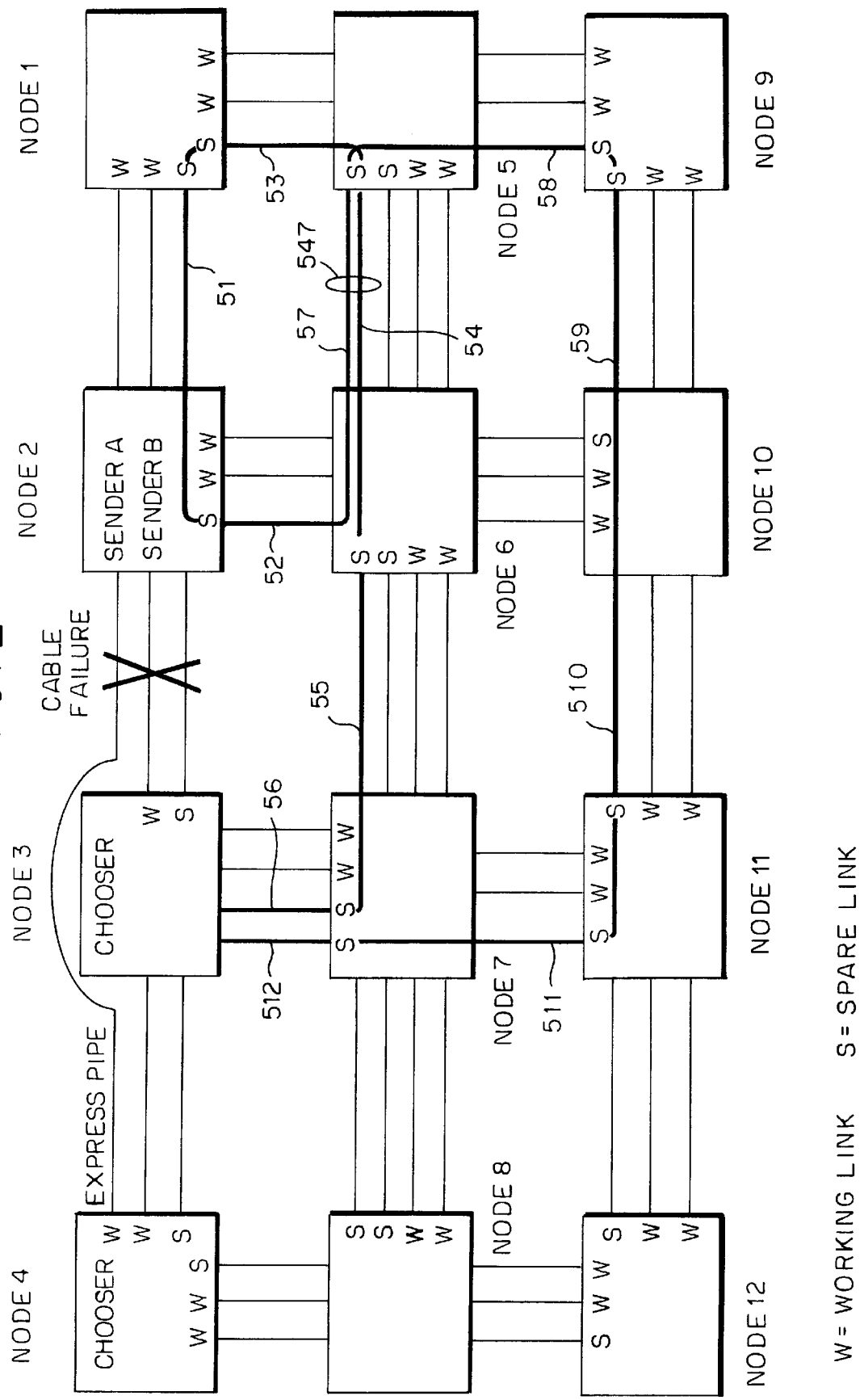
FIG. 2 is an illustration of two alt-routes for a sender/chooser pair that does not realize that the two routes share a common link.

FIG. 2 further illustrates the deadly embrace conundrum. As shown, there are two potential alt-routes connecting sender B of node 2 to the node 3 chooser. Specifically, the first alt-route goes from node 2 to node 6 to node 5 to node 9 to node 10 to node 11 to node 7 and finally to node 3. It uses spare links S2, S7, S8, S9, S10, S11 and S12. The second alt-route goes from node 2 to node 1 to node 5 to node 6 to node 7 and then to node 3. It uses spare links S1, S3, S4, S5 and S6. Upon further examination, it can be seen that the traffic for the first alt-route sends traffic from node 6 to node 5 via spare link S7 while the second alt-route sends traffic from node 5 to node 6 along spare link S4. The respective traffic for the alt-routes thus goes in opposite directions. Yet in actuality, spare links S7 and S4 are one and the same, as the same spare link connects node 5 to node 6 and both transceive through the same ports at nodes 5 and 6.

Putting it differently, the same interfacing, or same spare port, at node 6, is receiving the multicasting of flooding signatures from both node 2 and node 5 from both directions unidirectionally. As illustrated, in one direction, the affected spare port is a precursor port that is receiving a flooding signature from its adjacent node 5, while in the other direction, the port in node 6 is receiving a multicast flooding signature from another direction, namely from node 2. Thus, FIG. 2 shows an example of two alt-routes reserving the same link between nodes 5 and 6, namely spare link S47 (a designation that identifies both spare links S4 and S7 to be the same link). Yet the same spare link cannot restore both alt-routed traffic bi-directionally. Putting it simply, sender B will not know which path, if any, it can use for finding an alt-route to chooser node 3.

To prevent the scenario illustrated in FIG. 2, the instant invention adds an internal rule to the SHN scheme which prohibits the multicasting of any flooding signature into any spare port, or spare link, that is currently receiving a flooding signature. This will prevent the FIG. 2 scenario in most cases. Yet since flooding signatures do race for spare links, there are cases where a node may multicast into a spare port or a spare link, at very nearly the same time as the same spare port, or spare link, is being multicast by a flooding signature from an adjacent node. This is similar to the deadly embrace problem in telephony.

The inventor recognizes that there are a number of arbitration methods that can be used to remedy this deadly embrace problem, so long as the rule is there to prohibit the multicasting of any flooding signature into any spare port that is currently receiving a flooding signature. Some of these methods may include a priority method where a certain node always gets priority over other nodes such as for example a number based priority method. Another method may be based on the Ethernet type priority scheme which basically detects the collision between two incoming signals, backs off both links and then randomly retransmits the signal into the links again, hoping that the next transmission would not cause any collision.

Figure 3:
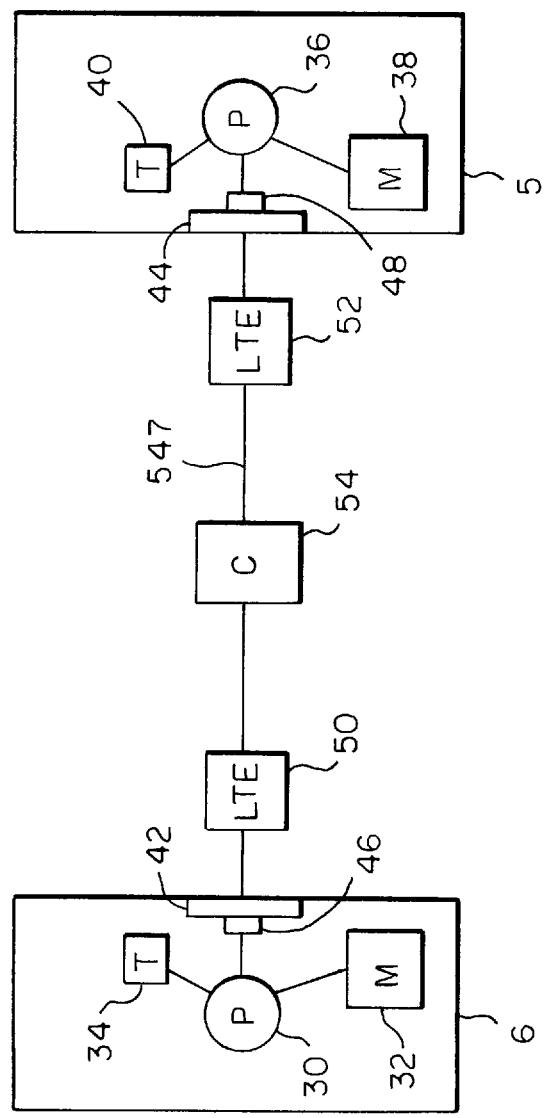
FIG. 3 is a simplified block diagram illustrating the connection between two adjacent nodes of the instant invention.

Reference FIG. 3 for a discussion of the particular contention scheme and the system of the instant invention. As shown, intermediate nodes 5 and 6, each represented by a conventional digital cross connect switch (DCS) such as an Alcatel 1633-SX switch, are connected to each other via a spare link S47. For the sake of simplicity, no other working links or spare links, and their respective interfaces, are shown in FIG. 3.

In particular, each of the DCSs includes a processor P having connected thereto a memory store M and a timer T. For the DCS of node 6, the processor is designated 30, its memory store 32 and its timer 34. Likewise, for the DCS of node 5, the processor is designated 36, its memory store 38 and its timer 40. In addition, there is an interface unit in each of the DCSs, designated 42 in the node 6 DCS and 44 in the node 5 DCS. Each of these interfaces is an integrated circuit card that acts as the input port for transceiving signals, messages or signatures, into and out of each DCS. Integrated to each of the interfaces 42 and 44 is a detector for detecting a loss of signal from the link connected thereto. In other words, if there is a signal failure, such will be detected by interfaces 42 and 44. Also connected to each of interfaces 42 and 44 are respective switches 46 and 48 for prohibiting the broadcasting or multicasting of any signal into a spare link, for example in this instance spare link S47.

As further shown in FIG. 3, spare link S47 connects the DCSs of nodes 5 and 6. The length of spare link S47 can easily be measured as the distance separating nodes 5 and 6. Positioned along spare link S47 are a number of equipment or components, such as the line terminating equipment (LTE) 50 and 52 for transceiving light signals from the respective DCSs. Oftentimes additional equipment or components such as for example, component 54 is also positioned and/or mounted along the links such as spare link S47. Accordingly, the time for which a signal or message traverses across a link is dependent not only on the length of the link, i.e. can be equated with the length of the link, but also on any delays caused by equipment positioned on the link through which the signal or message needs to travel. It is these characteristics of a link that the inventor has utilized in formulating the solution to the deadly embrace problem.

Specifically, suppose LTE 50 has a time delay of 6 $\mu$s, component 54 has a 0.3 ms time delay, and LTE 52 causes a 4 $\mu$s time delay for a flooding signature passing therethrough. Further assume that there is a time delay of 0.5 ms for a signal to travel from interface 42 of node 6 to interface 44 of node 5 across the length of spare link S47, given the fact that light travels at 4.95 $\mu$s per kilometer. Thus, even though it is not significant, there nonetheless is a time delay, a period of time, for a signal or signature or message to traverse from interface 42 to interface 44. For the embodiment shown in FIG. 3, it may be assumed that the time delay for a signal to travel from interface port 42 to interface port 44 is the same when the same type of signal traverses from interface port 44 to interface port 42. However, that is not necessarily the case as delays could be distinct for each direction. Therefore, the time delays caused by the same components along a link may in fact be different depending on which direction a signal travels as for example between nodes 5 and 6.

Be that as it may, the instant invention utilizes this time delay as follows. A timer, such as 34 in node 6 and 40 in node 5, which may be referred to as a tandem node link arbitration timer, provides a predefined period of time for a signal to traverse from one node across a link to its adjacent node. For the FIG. 3 example embodiment, therefore, timer 34 of node 6 provisions a predefined or predetermined time period of, for example 50 ms, for a signal such as a flooding message to traverse from interface port 42 of node 6 to interface port 44 of node 5. Further suppose that tandem node link arbitration timer 40 of node 5 has also provisioned a 50 ms time delay for a signal such as a flooding signature to traverse from interface port 44 to interface port 42. Of course, bear in mind that timer 40 may in fact need to provision a different period of time for a signal to traverse from node 5 to node 6, as was stated before.

The provisioning of the predefined time period may be achieved by node 6 sending a sample signal across the spare link periodically, before any failure, to obtain a measure of the time delay. Ditto for the provisioning of the predefined time period from a signal traversing from node 5 to node 6. The measurement of the total time delay between the adjacent nodes may be effected by first measuring the respective time delays of the different components along the spare link and then summing these time delays with the delay caused solely by the length of the link. The actual measurement of the various time delays may be carried out by the respective processors of the nodes working in conjunction with their respective detectors at the interfaces. So too delay data provided by manufacturers of the components may be stored in the memory of the nodes for reference.

Having thus provisioned a time period, the present invention is also premised on the fact that if for example node 6 has sent out a flooding signature from interface port 42 towards node 5 at time 0, then at 50 ms from time 0, node 6 will know that node 5 did not send out a signal before node 6 has sent out its. Thus, if the detector in interface 42 were to detect a signal sent from node 5 prior to the end of the 50 ms time period, all things being equal, assuming that a signal takes likewise 50 ms to travel from node 5 to node 6, then node 6 knows that node 5 had sent its signal earlier than when node 6 sent its signal. This determination of who is first is made by processor 30 in node 6, utilizing both the predefined period of time from timer 34 and any additional indexes and required data retrieved from memory store 32. For example, the predefined time period of node 5 could very well be stored in memory 32 so that processor 30 can make a comparison of when a signal is sent out by node 6 and when a signal was received by node 6.

In the instance where processor 30 has made a determination that the signal sent out from node 6 has reached node 5 and yet no signal from node 5 has been detected by interface 42, then node 6 knows that spare link S47 is to be reserved for its use. Thus, the alt-route shown in FIG. 2 and indicated by links S2, S47, S8, S9, S10, S11 and S12 is the route that is to be used to restore traffic between node 2 and node 3. Meanwhile, knowing that the alt-route is to be reserved for node 6, node 5 may activate a switch thereat, namely switch 48, to prohibit any signal to be broadcast into spare link S47 by node 5. In other words, the rule mentioned previously of prohibiting other nodes from broadcasting into a spare link to which a flooding message or signature already has been received is effected.

At the same time, from the perspective of node 5, the reverse takes place so that node 5 gives up its attempt to reserve spare link S47 for its use. The way in which node 5 reaches this decision is as follows. Assume that node 5 has also multicast a flooding signature or restoration signal into spare link S47 at substantially the same time that a flooding signature was sent by node 6 into the same link. Since node 5 is performing its own arbitration independently of that being performed by node 6, assume the flooding signature sent out by node 5 would have reached node 6 by the end of the period of time predefined by timer 40. Yet before the end of that predefined time period, node 5 receives, via interface 44, a flooding signature from node 6. Given that and the fact that the predefined time period for its flooding signature has not lapsed, node 5 realizes that node 6 had in fact sent out a message before node 5 had sent out its. Accordingly, node 5 gives up any attempt of trying to reserve spare link S47 for its own use.

In essence, the present invention utilizes a first come first serve type of priority arbitration in which two adjacent tandem nodes each determine independently whether it should reserve or give up a common spare link by ascertaining whether or not a signal is detected from the another tandem node within a given time period from when it had sent out its own signal to that tandem node. If no signal from the adjacent tandem node is detected within the predetermined time period, then the node can reserve the spare link for its own use. If a message is received from the adjacent tandem node before the predetermined time has lapsed, then the node will yield the spare link to the other tandem node.

Inasmuch as the present invention is subject to many variations, modifications, and changes in detail, it is intended that all matter described throughout this specification and shown in the accompanying drawings be interpreted as illustrative only and not in a limiting sense. Accordingly, it is intended that the invention be limited only by the spirit and scope of the appended claims.

I claim:

1. A method of arbitrating which of two adjacent nodes of a telecommunications network is entitled to use a spare link for restoring traffic disrupted by a failure of said network if both of said adjacent nodes are contending for said spare link, comprising the steps of:
   a) determining the total time it takes for a signal to traverse along said spare link from one node of said adjacent nodes to an other node of said adjacent nodes;
   b) determining the total time it takes for a signal to traverse along said spare link from said other node to said one node;
   c) deciding said spare link is to be dedicated for the use of said one node if the signal sent out by said one node is determined to have reached said other node before the signal sent out by said other node is received by said one node; and
   d) deciding said spare link is to be dedicated for the use of said other node if the signal sent out by said other node is determined to have reached said one node before the signal sent out by said one node is received by said other node.

2. The method of claim 1, wherein each of said determining step further comprises the steps of:
   measuring the time delay caused by each signal routing component positioned along said spare link to a signal passing therethrough;
   measuring the time it takes a signal to travel across said spare link without taking into account the time delay caused by said each signal routing component; and
   combining the time delays caused by each of said signal routing components and the time the signal takes to travel the length of said spare link to ascertain said total time.

3. The method of claim 1, further comprising the step of:
   prohibiting broadcasting of any other signals into said spare link while said spare link is receiving a signal.

4. The method of claim 1, further comprising the step of:
   generating said total time of steps a and b by taking into account time delays caused by signal routing components along said spare link to a signal traversing therethrough and the time said signal takes to traverse across the length of said spare link, respectively.

5. In a telecommunications network having a plurality of nodes, a method of preventing messages being flooded by two nodes into a spare link sandwiched therebetween at substantially the same time, comprising the steps of:
   provisioning a first time period at the end of which a message should have traversed from one node to an other node of said two nodes;
   provisioning a second time period at the end of which a message should have traversed from said other node to said one node; and
   deciding said one node to have reserved said spare link for its use if said one node has sent out a message to said other node and has not received a message from said other node prior to the termination of said first time period.

6. The method of claim 5, further comprising the step of:
   deciding said other node to have reserved said spare link for its use if said other node has sent out a message to said one node and has not received a message from said one node prior to the termination of said second time period.

7. The method of claim 5, further comprising the step of:
   prohibiting the broadcasting of any other signals into said spare link while said spare link is receiving a signal.

8. The method of claim 5, wherein each of said provisioning steps comprises the step of:
   combining the time it takes a signal to travel across said spare link and any time delays caused to said signal by equipment positioned along said spare link for transmitting or receiving messages.

9. The method of claim 5, wherein said provisioning steps further comprise the step of:
   generating said first and second time periods by taking into account time delays caused by equipment positioned along said spare link to a signal and the time said signal takes to traverse across the length of said spare link.

10. A method of deciding whether a node is entitled to the exclusive use of a spare link connecting it to a far end node when both said node and said far end node are contending for said spare link, comprising the steps of:
    defining a predetermined period of time a message takes to traverse across said spare link from said node to said far end node;
    deciding said node to have exclusive use of said spare link if the amount of time since it forwarded its message across said spare link to said far end node has exceeded said predetermined period of time and no message has been detected by said node from said far end node.

11. The method of claim 10, further comprising the step of:
    prohibiting any other messages from being sent to said spare link while said spare link already has a message broadcasted thereon.

12. The method of claim 10, wherein said defining step further comprises the steps of:
    utilizing the characteristics inherent in components positioned along said spare link which add delays to the time for a message to travel along said spare link;
    equating the length of said spare link with an amount of time a message takes to travel across said spare link; and
    combining the delayed time due to said components and the equated time from said spare link to ascertain said predetermined period of time.

13. The method of claim 10, wherein said defming step further comprises the step of:
    generating said predetermined period of time by taking into account time delays caused by components positioned along said spare link to a message traversing therethrough and the time said message takes to traverse across the length of said spare link.

14. In a telecommunications network having a plurality of nodes and multiple links including spare links connecting said nodes, apparatus for deciding whether a node is entitled to the exclusive use of a spare link connecting said node to a far end node when both said node and said far end node are contending for said spare link, comprising:

means for defining a predetermined period of time a message takes to traverse across said spare link from said node to said far end node; and means for deciding said node to have exclusive use of said spare link if the amount of time since said node forwarded its message across said spare link to said far end node has exceeded said predetermined period of time and no message has been detected by said node from said far end node.

15. Apparatus of claim 14, further comprising:

means for prohibiting any other messages from being sent to said spare link while said spare link already has a message broadcast thereon.

16. Apparatus of claim 14, wherein said deciding means further comprises:

means for measuring the characteristics inherent in components positioned along spare link which add delays to the time for a message to traverse along said spare link;

means for equating the length of said spare link with an amount of time a message takes to travel across said spare link; and means for combining the delayed time resulting from said components and the equated time from said spare link to ascertain said predetermined period of time.

17. Apparatus of claim 14, wherein said defining means further comprises:

timer means for generating said predetermined period of time by taking into account time delays caused by components positioned along said spare link to a message traversing therethrough and the time said message takes to traverse across the length of said spare link.

18. System for arbitrating which of two adjacent nodes of a telecommunications network is entitled to use a spare link for restoring traffic disrupted by a failure of said network if both of said adjacent nodes are contending for said spare link, composing:

first timer means for defining a predetermined time it takes for a signal to traverse along said spare link from one node of said adjacent nodes to other node of said adjacent nodes;

second timer means for defining a predetermined time it takes for a signal to traverse along said spare link from said other node to said one node; and processor means for deciding said spare link is to be dedicated for the use of said one node if the signal sent out by said one node is determined to have reached said other node before the signal sent out by said other node is received by said one node, said processor means further deciding said spare link is to be dedicated for the use of said other node if the signal sent out by said other node is determined to have reached said one node before the signal sent out by said one node is received by said other node.

19. System of claim 18, further comprising:

means for measuring any time delay caused by each component positioned along said spare link to a signal traversing therethrough;

means for measuring the time said signal takes to travel across said spare link between each of said components; and means for combining the respective time delays caused by each of said components and the time a signal takes to travel the length of said spare link to ascertain said predetermined time defined by each of said timer means.

20. System of claim 18, further comprising:

means for prohibiting multicasting of any other signals into said spare link while it is receiving a signal.

21. System of claim 18, wherein each of said first and second timer means generates said predetermined time by taking into account time delays caused by components positioned along said spare link to a signal traversing therethrough and the time said signal takes to traverse across the length of said spare link.

22. In a telecommunications network having a plurality of nodes connected by multiple circuits including spare links, apparatus for preventing messages flooded by two nodes into a spare link sandwiched therebetween at substantially the same time for beginning a process of restoring traffic disrupted by a failure in said network, comprising:

means for provisioning one time period at the end of which a message should have traversed from one node to an other node of said two nodes;

means for provisioning an other time period at the end of which a message should have traversed from said other node to said one node;

decision means for deciding said one node to have reserved said spare link for its use if said one node has sent out a message to said other node and has not received a flooding message from said other node prior to the termination of said one time period.

23. Apparatus of claim 22, wherein said decision means further decides said other node to have reserved said spare link for its use if said other node has sent out a message to said one node and has not received a message from said one node prior to the termination of said other time period.

24. Apparatus of claim 22, further comprising:

means for prohibiting the broadcasting of any other signals into said spare link while said spare link is receiving a signal.

25. Apparatus of claim 22, wherein each of said provisioning means combines the time a signal takes to travel across said spare link and any time delays caused to said signal by equipment positioned along said spare link for transceiving messages to generate each of said one and other time periods.

26. Apparatus of claim 22, further comprising:

at least one timer means for generating said one and other time periods by taking into account time delays caused by equipment along said spare link to a signal and the time said signal takes to traverse across the length of said spare link.

* * * * *